United States Patent [19]

Rapp

[11] 4,082,487
[45] Apr. 4, 1978

[54] APPARATUS FOR CHANGING SCREEN DEVICES

[75] Inventor: Willard Emanuel Rapp, Franklin Township, Mercer County, N.J.

[73] Assignee: Western Electric Company, Inc., New York, N.Y.

[21] Appl. No.: 782,148

[22] Filed: Mar. 28, 1977

[51] Int. Cl.² .............................................. B29F 3/00
[52] U.S. Cl. .................................. 425/135; 210/232; 210/DIG. 15; 366/87; 425/183; 425/185; 425/192 R; 425/199; 425/376 R
[58] Field of Search ................... 264/176 R; 210/232, 210/238, DIG. 15; 425/197, 198, 199, 135, 183, 185, 192 R, 162, 376 R, 461; 259/185, 193

[56] References Cited

U.S. PATENT DOCUMENTS

| | | | |
|---|---|---|---|
| 3,007,199 | 11/1961 | Curtis | 425/185 |
| 3,059,276 | 10/1962 | Yokana | 425/185 |
| 3,804,758 | 4/1974 | Cooper et al. | 210/DIG. 15 |
| 3,856,277 | 12/1974 | Tiramini | 259/193 X |

OTHER PUBLICATIONS

SPE Journal, June 1963, pp. 547–549, Schultz, F. C., "Extruder Screening Devices."

Primary Examiner—Francis S. Husar
Assistant Examiner—Mark Rosenbaum
Attorney, Agent, or Firm—A. S. Rosen

[57] ABSTRACT

The disclosure concerns apparatus which automatically performs screen-changing functions associated with the use of screen devices for filtering extruded plastic materials. The apparatus includes a slide assembly with two apertured recesses for receiving screen devices, and mechanisms for aligning the recesses alternatingly with a direction of advance of the extruded plastic material. A screen device is replaced within one recess, as a screen device within the other recess filters the extruded plastic material. Such screen device replacement is provided through the automatic, sequential operations of screen device ejection, screen device carrier, screen device introducing and screen device reloading mechanisms.

7 Claims, 8 Drawing Figures

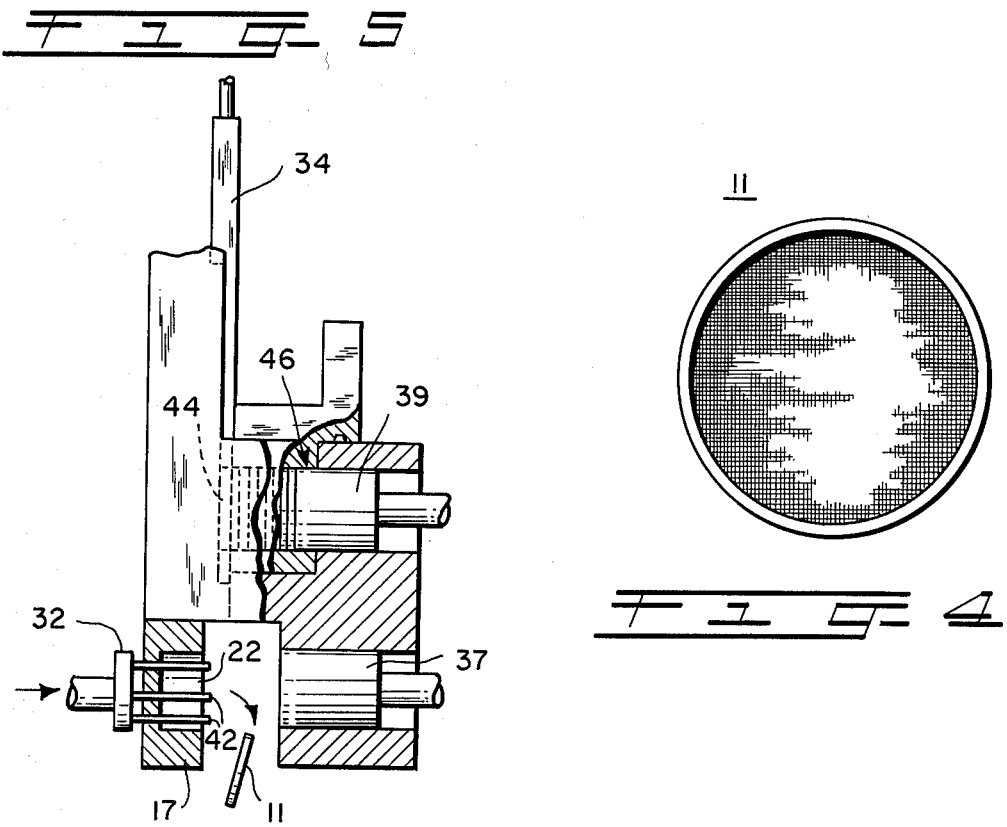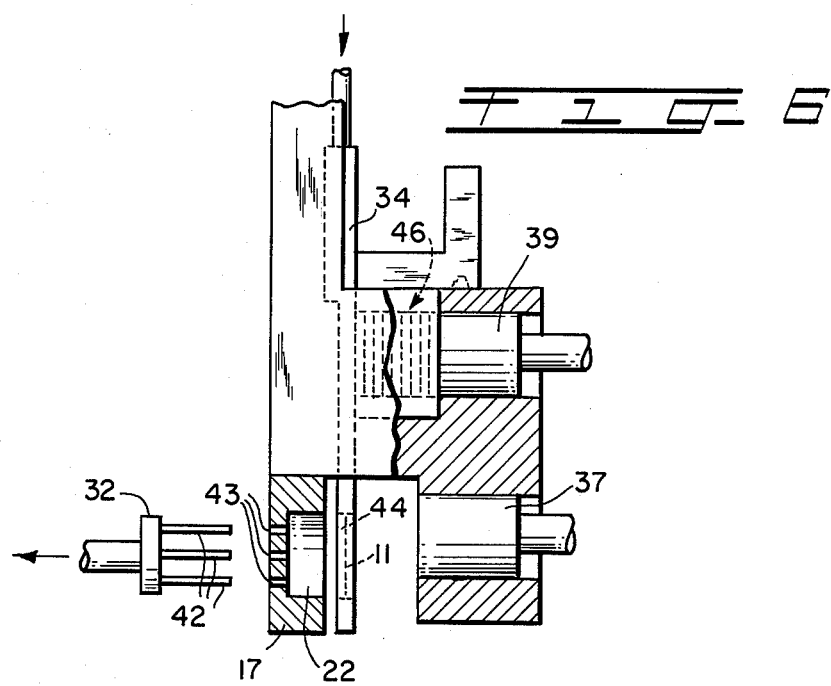

APPARATUS FOR CHANGING SCREEN DEVICES

BACKGROUND OF THE INVENTION

1. Field of the Invention

This invention relates to apparatus for changing screen devices which are utilized with plastics extrusion mechanisms and, more particularly, to apparatus which automatically performs screen-changing functions associated with the use of screen devices for filtering extruded plastic materials.

2. Description of the Prior Art

The use of screen devices for filtering extruded plastic materials is well known. Screening is particularly useful when extruding recycled plastics, in order to remove particles of dirt or other foreign matter from the recycled material. Screen devices, however, are particularly subject to clogging up when utilized in plastics recycling operations. Accordingly, the changing of screen devices at frequent intervals is necessary.

Mechanisms for changing screen devices, associated with plastics extruders, are known. For example, U.S. Pat. No. 3,059,276 to L. D. Yokana discloses apparatus wherein each of two parallel paths from an extruder cylinder contains a screen device, and wherein a valving arrangement conducts extruded plastic material alternatively to one or the other of the parallel paths, such that the screen device located in a currently idle path may be changed manually, while the screen device in a currently active path is performing the required filtering operation. In addition, U.S. Pat. No. 3,007,199 to J. E. Curtis discloses apparatus wherein two screen devices are located on a piston, which may be moved between two positions, each locating a different one of the screen devices in line with an extrusion head, such that one screen device may be removed for replacement while the other filters plastic material which is discharged from the extrusion head. The piston of the Curtis patent is power-operated between its two positions. However, each removal of an old screen device from the piston, and each replacement of a new screen device onto the piston, is done manually.

The various screen changing steps required by the prior art mechanisms, as just discussed, involving the manual performance of various functions, are considered unduly time consuming and excessively high in labor costs. This is particularly true in the case of large scale plastics recycling operations, where screen devices must be changed quite frequently, and where the rapid changing of screen devices would be quite advantageous economically.

SUMMARY OF THE INVENTION

The invention contemplates apparatus for changing screen devices in a plastics extrusion mechanism which discharges an extruded plastic material along a direction of advance or discharge from a discharge end thereof. The apparatus comprises a slide assembly housing, which may be mounted at the discharge end of the plastics extrusion mechanism, and which includes a slide chamber. The slide chamber has an axis of elongation disposed perpendicularly to the aforementioned direction of advance or discharge. The slide assembly housing has an inlet opening and an outlet opening disposed along opposite surfaces of the slide chamber in linear alignment with the direction of advance or discharge, such that the extruded plastic material advancing along the direction of advance or discharge may enter the inlet opening, pass through the slide chamber perpendicularly to the slide chamber axis, and exit through the outlet opening. A slide assembly, which is slidably moveable within the slide chamber along the slide chamber axis, includes first and second apertured recesses at respective first and second spaced locations therealong for receiving a first screen device and a second screen device, respectively, therein. The first recess is located in alignment with the direction of advance or discharge between the inlet and outlet openings of the slide chamber in a first position of the slide assembly, while the second recess is located in alignment with the direction of advance or discharge between the inlet and outlet openings of the slide chamber in a second position of the slide assembly. The apparatus also includes first means for sliding the slide assembly alternatingly between the first and second positions thereof; second means, responsive to the slide assembly entering into the first position of the slide assembly, for generating a screen-change signal; and third means, responsive to the screen-change signal, for removing a used screen device from the second recess and introducing a new screen device into the second recess.

In addition, apparatus in accordance with the invention preferably also includes fourth and fifth means, corresponding to the aforementioned second and third means, respectively, and effective to change screen devices in the first recess upon entry of the slide assembly into its second position.

The described screen-changing apparatus may constitute an integral part of a novel plastics extrusion mechanism. Alternatively, the screen-changing apparatus may be a separate unit which is adapted for mounting at the discharge end of any standard, commercially available, plastics extruder.

BRIEF DESCRIPTION OF THE DRAWINGS

FIG. 4 is an illustration of a screen device which may be employed in the apparatus of FIGS. 1-3; and FIGS. 5-8 are enlarged vertical views, partly in section and with parts broken away, showing the sequence of operation of various elements of the apparatus of FIGS. 1-3 in performing their screen-changing functions.

DETAILED DESCRIPTION

Figure 1:
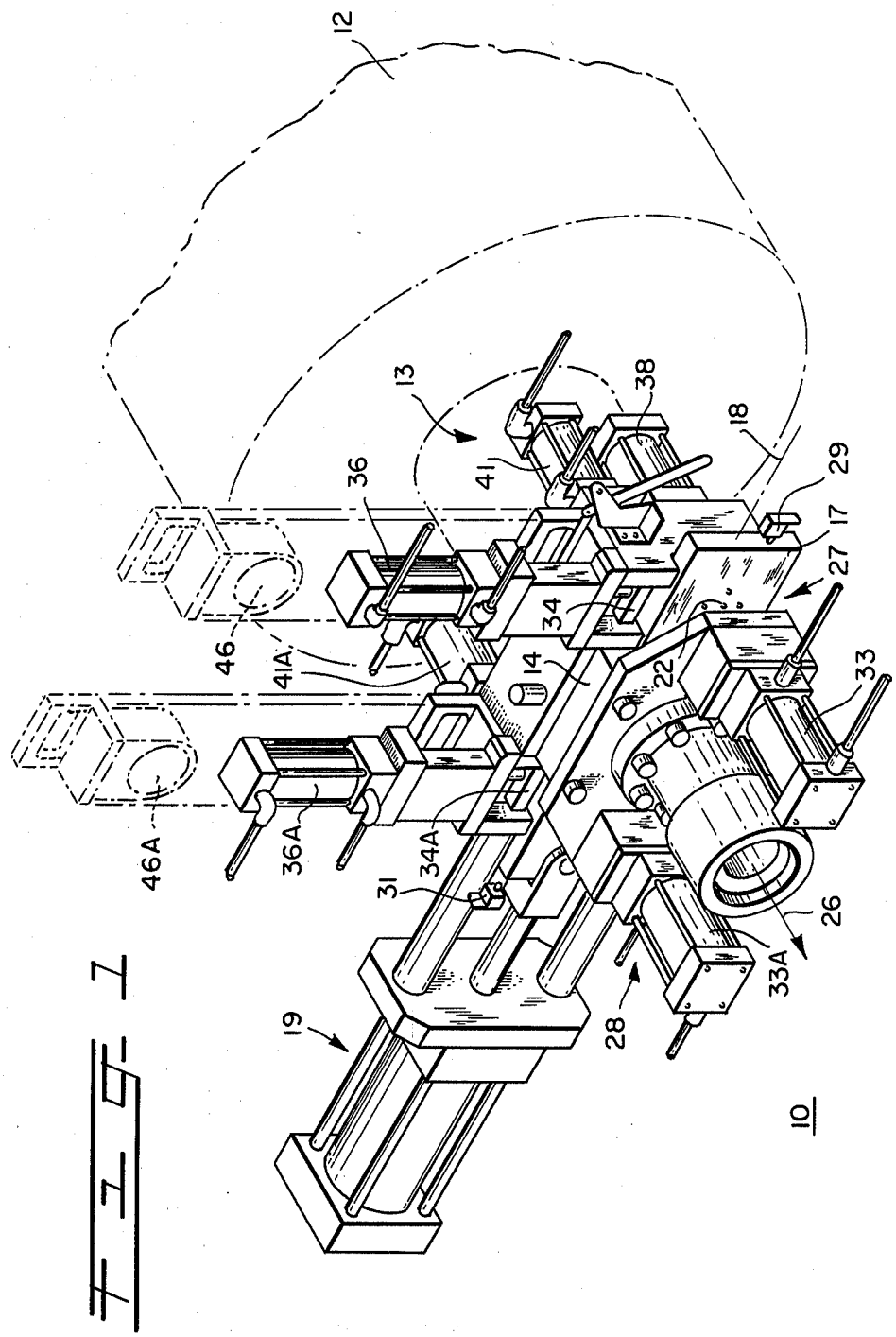
FIG. 1 of the drawing is an isometric view of apparatus, constructed in accordance with the principles of the invention, for changing screen devices which are utilized to filter a plastic material discharged from a plastics extrusion mechanism.

Referring initially to FIGS. 1-4 of the drawing, an apparatus 10 operates automatically to change screen devices 11. Such screen devices 11 serve to filter out foreign matter from extruded plastic materials being discharged from a plastics extrusion mechanism 12. The apparatus 10 may constitute a separate unit, adapted for mounting at a discharge end 13 of the extrusion mechanism 12. Alternatively, the apparatus 10 may be an integral part of the extrusion mechanism 12.

Figure 2:
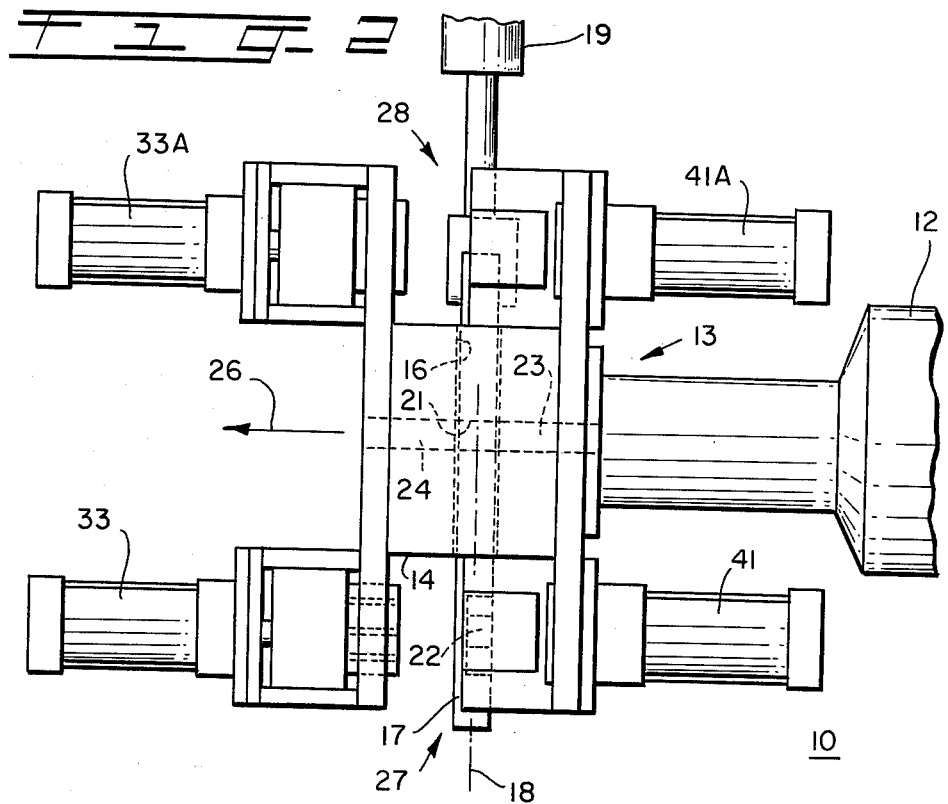
FIGS. 2 and 3 are, respectively, a plan view and an end elevational view of the apparatus of FIG. 1, depicting additional aspects of the screen-changing apparatus.

The apparatus 10 includes a slide assembly housing 14 which surrounds a slide chamber 16 (FIG. 2). A slide assembly 17 is adapted for reciprocating sliding movement within the slide chamber 16, along a longitudinal axis 18, under the control of a first piston and cylinder assembly 19. The slide assembly 17 includes first and second spaced, apertured recesses 21 and 22, respectively, each of which recesses is adapted to retain a screen device 11 therein.

In a first position of the slide assembly 17 (FIGS. 1 and 2), the first recess 21 is so located within the slide chamber 16 (FIG. 2) as to be aligned between an inlet opening 23 and an outlet opening 24 of the slide assembly housing 14 along a direction of advance or discharge of extruded plastic material from the extruder 12, which direction is identified by an arrow 26 in FIGS. 1 and 2 of the drawing. Meanwhile, the second recess 22 in the slide assembly 17 is located outside of the slide assembly housing 14 at a first side thereof, in a first screen-changing station 27. In a second position of the slide assembly 17 (not shown), the second recess 22 is so located within the slide chamber 16 as to be aligned between the inlet and outlet openings 23 and 24 of the slide assembly housing 14 along the direction of advance or discharge indicated by the arrow 26. Meanwhile, the first recess 21 in the slide assembly 17 is located outside of the slide assembly housing 14 at a second side thereof, in a second screen-changing station 28. A pair of limit switches 29 and 31 (FIG. 1) may be employed, in conventional manner, to indicate that the slide assembly 17 is in its first position or its second position, respectively.

Figure 3:
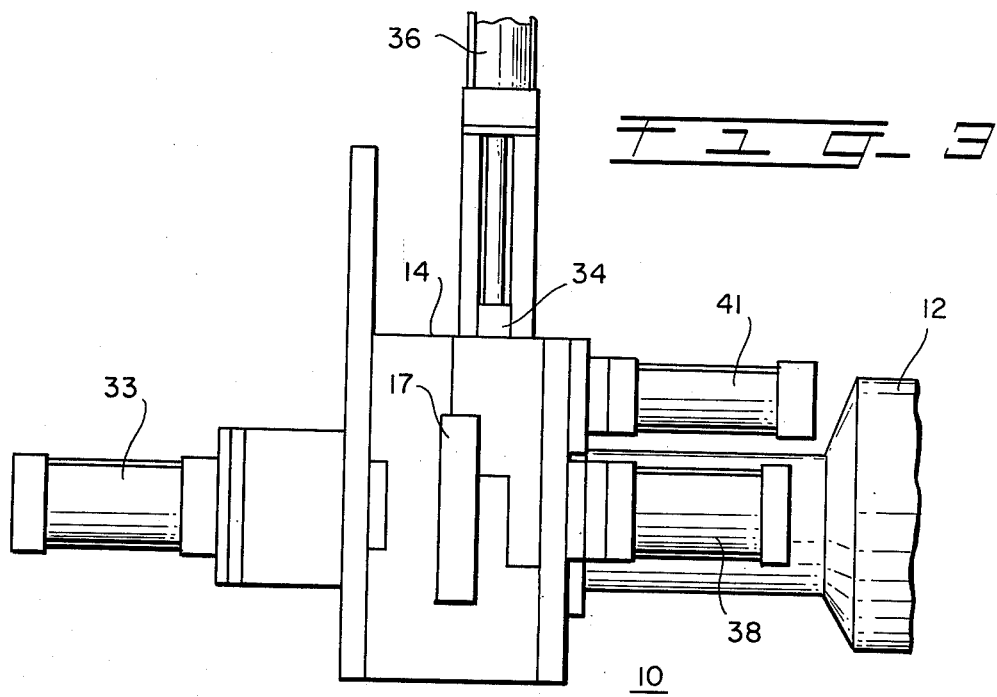

The various mechanisms located at the first and second screen-changing stations 27 and 28 are identical. Accordingly, only one such station, the first screen-changing station 27, will be described in detail hereinafter. The first screen-changing station 27 includes, generally, a screen device ejection mechanism 32 (FIGS. 5-8) operated by a second piston and cylinder assembly 33 (FIGS. 1 and 2), a slidably mounted screen device carrier 34 (FIGS. 1, 3 and 5-8), a third piston and cylinder assembly 36 (FIGS. 1 and 3) for sliding the screen device carrier 34 between a screen device introducing position (FIGS. 6 and 7) and a screen device reloading position (FIGS. 5 and 8) thereof, a screen device introducing mechanism 37 (FIGS. 5-8) operated by a fourth piston and cylinder assembly 38 (FIGS. 1 and 3), and a screen device reloading mechanism 39 (FIGS. 5-8) operated by a fifth piston and cylinder assembly 41 (FIGS. 1-3). Like mechanisms which are located at the second screen-changing station 28 are labeled in the drawing with corresponding numerals, each followed by the suffix "A," e.g., the piston and cylinder assembly 33A.

The screen device ejection mechanism 32 includes a number of projecting fingers 42,42, which are aligned for entry into the second recess 22 in the slide assembly 17 through a like number of apertures 43,43. Such entry of the fingers 42,42 into the second recess 22, so as to eject a used, clogged screen device 11 from the second recess 22 as shown in FIG. 5, may be initiated by a screen-change signal from the limit switch 29, i.e., a signal that the slide assembly 17 has entered into its first position, as illustrated in FIG. 1. The screen-change signal may be applied through any conventional electro-pneumatic or electro-hydraulic control mechanism (not shown) to actuate the second piston and cylinder assembly 33.

Figure 7:
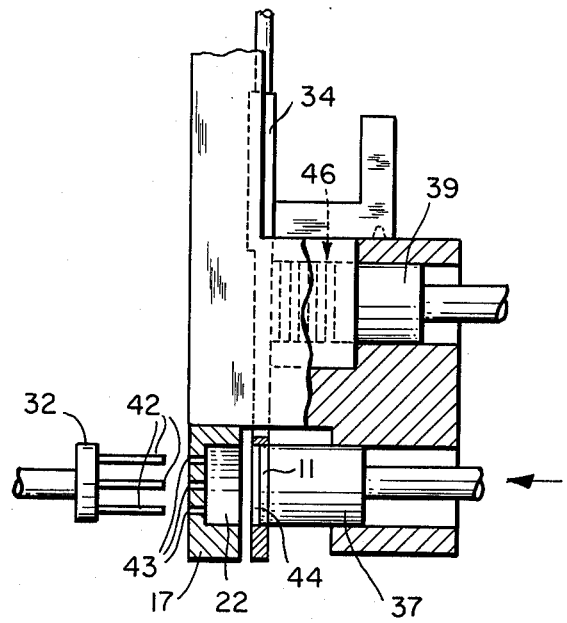
Figure 8:
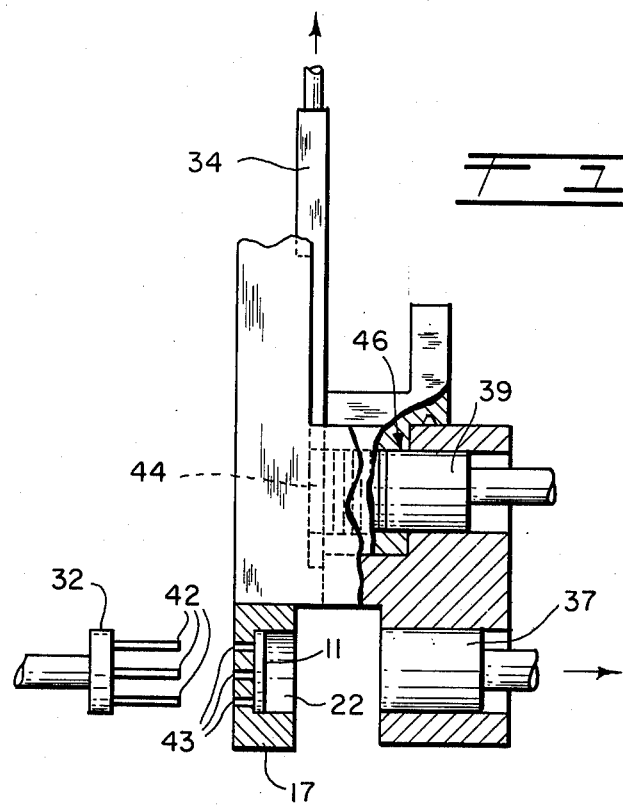

The screen device carrier 34 is shown in its screen device introducing position in FIGS. 6 and 7 of the drawing, and in its screen device reloading position in FIGS. 5 and 8. The screen device carrier 34 includes an aperture 44 which is adapted to house temporarily a single screen device 11. The screen device carrier 34 is aligned in its screen device reloading position with the screen device reloading mechanism 39 such that a screen device 11 may be fed into the aperture 44 from a magazine 46 (FIG. 8) upon the operation of the fifth piston and cylinder assembly 41. The screen device carrier 34 may thereafter be moved, by operation of the third piston and cylinder assembly 36, into the screen device introducing position, where the aperture 44 in the screen device carrier 34 is aligned with the screen device introducing mechanism 37 (FIG. 6). The fourth piston and cylinder assembly 38 may then be operated, with the screen device carrier 34 in such screen device introducing position and the slide assembly 17 in its first position (FIG. 7), in such manner as to move the screen device introducing mechanism 37 toward the second recess 22 in the slide assembly 17, thereby pushing the screen device 11 carried within the aperture 44 in the screen device carrier 34 out of such aperture 44 and into the second recess 22 in the slide assembly 17 (FIG. 7), whereupon the fourth piston and cylinder assembly 38 may operate to withdraw the screen device introducing mechanism from the second recess 22 and the aperture 44, in the slide assembly 17 and screen device carrier 34, respectively (FIG. 8).

The operation of the apparatus 10 will next be described with reference to a single cycle of operations, beginning with the slide assembly 17 entering into its first position (FIGS. 1 and 2). The extrusion mechanism 12 is currently functioning to discharge an extruded plastic material along the direction of the arrow 26 in FIGS. 1 and 2 of the drawing. Thus, the extruded plastic material may now begin to advance from the inlet opening 23 in the slide assembly housing 14 (FIG. 2) through a clean screen device 11 retained within the first recess 21 in the slide assembly 17, such that a filtered plastic material may pass through the apertures 43,43 and exit through the outlet opening 24 in the slide assembly housing 14.

Meanwhile, as the slide assembly 17 enters into its first position, the limit switch 29 is operated, generating a screen-change signal indicative of such repositioning of the slide assembly 17. The apparatus 10 is presently in the condition indicated in FIGS. 1-3 and 8 of the drawing, with the screen device carrier 34 in its screen device reloading position and with a new screen device 11 located in the aperture 44 of the screen device carrier 34.

The screen-change signal generated by the limit switch 29 actuates the second piston and cylinder assembly 33, causing the screen device ejection mechanism 32 to move to the right, as illustrated in the drawing, from the position of FIG. 8 to the position of FIG. 5. Thus, the projecting fingers 42,42, are extended through the apertures 43,43 in the slide assembly 17 and into the second recess 22, forcing the used screen device 11 to fall from the second recess 22 into a suitably positioned receptacle, e.g., for cleaning and subsequent reuse. The second piston and cylinder assembly 33 thereupon completes its cycle of operation by withdrawing the screen device ejection mechanism 32 toward the left, as illustrated in the drawing, from the position of FIG. 5 to that of FIG. 6.

The third piston and cylinder assembly 36 is next operated to move the screen device carrier 34 from its screen device reloading position (FIG. 5) to its screen device introducing position (FIG. 6), so as to locate the new screen device 11, carried within the aperture 44 of the screen device carrier 34, in alignment with the now empty second recess 22 in the slide assembly 17. Such operation of the third piston and cylinder assembly 36 may be initiated by any conventional mechanism, e.g., a limit switch (not shown), which indicates that the screen device ejection mechanism 32 is approaching, or has entered into, its withdrawn position, as shown in FIG. 6 of the drawing.

The fourth piston and cylinder assembly 38 is next operated to move the screen device introducing mechanism 37 to the left, as illustrated in the drawing, from the position of FIG. 6 to that of FIG. 7 and then further to the left, so as to force the new screen device 11 from the aperture 44 in the screen device carrier 34 into the second recess 22 in the slide assembly 17, where the new screen device 11 is thereupon retained. Such operation of the fourth piston and cylinder assembly 38 may be initiated by any conventional mechanism, e.g., a limit switch (not shown), which indicates that the screen device carrier 34 has entered into its screen device introducing position, as shown in FIG. 6 of the drawing. The fourth piston and cylinder assembly 38 thereupon completes its cycle of operations by withdrawing the screen device introducing mechanism 37 toward the right, as illustrated in the drawing, from the position of FIG. 7 to that of FIG. 8.

The third piston and cylinder assembly 33 is next operated to return the screen device carrier 34 from its screen device introducing position (FIG. 7) to its screen device reloading position (FIG. 8) so as to align the aperture 44 in the screen device carrier 34 with the magazine 46. Such operation of the third piston and cylinder assembly may be initiated by any conventional mechanism, e.g., a limit switch, which indicates that the screen device introducing mechanism 37 has entered into its withdrawn position, as shown in FIG. 8 of the drawing.

The fifth piston and cylinder assembly 41 may now be operated to force another new screen device from the magazine 46 so as to reload the aperture 44 in the screen device carrier 34. Such operation of the fifth piston and cylinder assembly 41 may be initiated by any conventional mechanism, e.g., a limit switch, which indicates that the screen device carrier 34 has re-entered its screen device loading position (FIG. 8).

The slide assembly 17 currently has the new screen device 11 retained within the second recess 22. The extrusion mechanism 12 is meanwhile functioning to discharge the extruded plastic material along the direction of the arrow 26 in FIGS. 1 and 3 of the drawing. Thus, the screen device 11 retained within the first recess 21 in the slide assembly 17 is gradually becoming clogged with foreign matter filtered from the extruded material.

At a suitable time, an operation of the first piston and cylinder assembly 19 is initiated, causing the slide assembly 17 rapidly to enter into its previously described second position. The new screen device 11 within the second recess 22 in the slide assembly 17 thereupon commences immediately to filter out further foreign matter from the extruded material, with the first recess 21 in the slide assembly 17 now being located at the second screen-changing station 28. Such operation of the first piston and cylinder assembly 19 may be initiated by any suitable mechanism, e.g., a timing device or a facility for sensing that the screen device 11 within the first recess 21 in the slide assembly 17 is becoming clogged.

The various mechanisms located at the second screen-changing station 28 meanwhile begin operating, in response to a screen-change signal from the limit switch 31 upon the entry of the slide assembly 17 into its second position, to replace the used screen device 11 in the first recess 21 of the slide assembly 17, in similar manner to the described operation of the corresponding mechanisms at the first screen-changing station 27. Thus, the apparatus 10 may continue to function with the slide assembly 17 in its second position until such time as the first piston and cylinder assembly 19 may be operated to return the slide assembly 17 to its first position for replacement of the screen device 11 in the second recess 22 of the slide assembly, completing a full cycle of operations of the apparatus 10.

As shown in phantom lines in FIG. 1 of the drawing, the magazines 46 and 46A may be removed occasionally, at appropriate times, for reloading of screen devices 11 therein, e.g., screen devices 11 which have been cleaned for reuse in the apparatus 10.

It is to be understood that the described apparatus is simply illustrative of a preferred embodiment of the invention. In other embodiments, the various piston and cylinder assemblies might be replaced by other, equivalent devices for operating the various mechanisms of the apparatus. Many other modifications may, of course, also be made in accordance with the principles of the invention.

I claim:

1. Apparatus for changing screen devices, which apparatus is adapted for use with a plastics extrusion mechanism having a discharge end, the apparatus comprising:

a slide assembly housing adapted for mounting at the discharge end of the plastics extrusion mechanism and including a slide chamber, the slide assembly housing having an inlet opening and an outlet opening disposed along opposite surfaces of the slide chamber in linear alignment along a discharge direction, which discharge direction is disposed perpendicularly to an axis of elongation of the slide chamber, in such manner that an extruded plastic material discharged along said discharge direction from the plastics extrusion mechanism, at the discharge end of which the apparatus is adapted for mounting, may enter said inlet opening, advance through the slide chamber perpendicularly to said slide chamber axis, and exit through said outlet opening;

a slide assembly slidably movable within said slide chamber along said slide chamber axis and including first and second apertured recesses at respective first and second spaced locations therealong for receiving a first screen device and a second screen device, respectively, therein, said first recess being located in alignment with said discharge direction between said inlet and outlet openings of the slide chamber in a first position of the slide assembly, and said second recess being located in alignment with said discharge direction between said inlet and outlet openings of the slide chamber in a second position of the slide assembly;

first, operatively associated with the slide assembly, means for sliding the slide assembly alternatingly between said first and second positions of the slide assembly;

second means, responsive to the slide assembly entering into said first position of the slide assembly, for generating a screen-change signal;

ejection means, responsive to said screen-change signal, for ejecting a used screen device from said second recess;

a screen device carrier slidably movable adjacent to said slide chamber so as to bring a new screen device into alignment with said second recess in said first position of the slide assembly;

additional sliding means operatively associated with said screen device carrier for so sliding said screen device carrier as to align said new screen device with said second recess in said first position of the slide assembly; and introducing means, operated with said new screen device aligned with said second recess in said first position of the slide assembly, for introducing said new screen device into said second recess from said screen device carrier.

2. Apparatus as set forth in claim 1, further comprising:

reloading means, operated between said aligning movements of said screen device carrier, for supplying additional new screen devices to said screen device carrier.

3. Apparatus as set forth in claim 1, further comprising:

third means, responsive to the slide assembly entering into said second position of the slide assembly, for generating a further screen-change signal; and fourth means, responsive to said further screen-change signal, for removing a used screen device from said first recess and introducing a new screen device into said first recess.

4. In combination with a plastics extrusion mechanism for discharging an extruded plastic material along a direction of advance at a discharge end thereof:

a slide assembly housing mounted at said discharge end of said plastics extrusion mechanism and including a slide chamber, the slide chamber having an axis of elongation disposed perpendicularly to said direction of advance, the slide assembly housing having an inlet opening and an outlet opening disposed along opposite surfaces of the slide chamber in linear alignment with said direction of advance such that the extruded plastic material advancing along said direction of advance may enter said inlet opening, pass through the slide chamber perpendicularly to said slide chamber axis, and exit through said outlet opening;

a slide assembly slidably movable within said slide chamber along said slide chamber axis and including first and second apertured recesses at respective first and second spaced locations therealong for receiving a first screen device and a second screen device, respectively, therein, said first recess being located in alignment with said direction of advance between said inlet and outlet openings of the slide chamber in a first position of the slide assembly, and said second recess being located in alignment with said direction of advance between said inlet and outlet openings of the slide chamber in a second position of the slide assembly;

first means, operatively associated with said slide assembly, for sliding the slide assembly alternatingly between said first and second positions of the slide assembly;

second means, responsive to the slide assembly entering into said first position of the slide assembly, for generating a screen-change signal;

ejection means, responsive to said screen-change signal, for ejecting a used screen device from said second recess;

a screen device carrier slidably movable adjacent to said slide chamber so as to bring a new screen device into alignment with said second recess in said first position of the slide assembly;

additional sliding means operatively associated with said screen device carrier for so sliding said screen device carrier as to align said new screen device with said second recess in said first position of the slide assembly; and introducing means, operated with said new screen device aligned with said second recess in said first position of the slide assembly, for introducing said new screen device into said second recess from said screen device carrier.

5. Apparatus as set forth in claim 4, further comprising:

reloading means, operated between said aligning movements of said screen device carrier, for supplying additional new screen devices to said screen device carrier.

6. In combination with a plastics extrusion mechanism for discharging an extruded plastic material along a direction of advance at a discharge end thereof:

a slide assembly housing mounted at said discharge end of said plastics extrusion mechanism and including a slide chamber, the slide chamber having an axis of elongation disposed perpendicularly to said direction of advance, the slide assembly housing having an inlet opening and an outlet opening disposed along opposite surfaces of the slide chamber in linear alignment with said direction of advance such that the extruded plastic material advancing along said direction of advance may enter said inlet opening, pass through the slide chamber perpendicularly to said slide chamber axis, and exit through said outlet opening;

a slide assembly slidably movable within said slide chamber along said slide chamber axis and including first and second apertured recesses at respective first and second spaced locations therealong for receiving a first screen device and a second screen device, respectively, therein, said first recess being located in alignment with said direction of advance between said inlet and outlet openings of the slide chamber in a first position of the slide assembly, and said second recess being located in alignment with said direction of advance between said inlet and outlet openings of the slide chamber in a second position of the slide assembly;

first means, operatively associated with said slide assembly, for sliding the slide assembly alternatingly between said first and second positions of the assembly;

second means, responsive to the slide assembly entering into said first position of the slide assembly, for generating a first screen-change signal;

third means, responsive to the slide assembly entering into said second position of the slide assembly, for generating a second screen-change signal;

first ejection means, responsive to said first screen-change signal, for ejecting a first used screen device from said second recess;

second ejection means, responsive to said second screen-change signal, for ejecting a second used screen device from said first recess;

a first screen device carrier slidably movable adjacent to said slide chamber so as to bring a first new screen device into alignment with said second recess in said first position of the slide assembly;

a second screen device carrier slidably movable adjacent to said slide chamber so as to bring a second new screen device into alignment with said first recess in said second position of the slide assembly;

first additional sliding means operatively associated with said first screen device carrier for so sliding said first screen device carrier as to align said first new screen device with said second recess in said first position of the slide assembly;

second additional sliding means operatively associated with said second screen device carrier for so sliding said second screen device carrier as to align said second new screen device with said first recess in said second position of the slide assembly;

first introducing means, operated with said first new screen device aligned with said second recess in said first position of the slide assembly, for introducing said first new screen device into said second recess from said first screen device carrier; and second introducing means, operated with said second new screen device aligned with said first recess in said second position of the slide assembly, for introducing said second new screen device into said first recess from said second screen device carrier.

7. Apparatus as set forth in claim 6, further comprising:

first and second reloading means, operated between said aligning movements of said first and second screen device carriers, respectively, for supplying additional new screen devices to said first and second screen device carriers, respectively.

* * * * *